US009856823B2

United States Patent
Chittenden (10) Patent No.: US 9,856,823 B2
(45) Date of Patent: Jan. 2, 2018

(54) HEAD GASKET FOR AN ENGINE

(71) Applicant: Caterpillar Inc., Peoria, IL (US)

(72) Inventor: Jonathan R. Chittenden, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 128 days.

(21) Appl. No.: 14/936,193

(22) Filed: Nov. 9, 2015

(65) Prior Publication Data

US 2017/0130670 A1    May 11, 2017

(51) Int. Cl.
*F02F 11/00* (2006.01)
*F02F 1/00* (2006.01)
*F02F 1/24* (2006.01)

(52) U.S. Cl.
CPC ............ *F02F 11/002* (2013.01); *F02F 1/004* (2013.01); *F02F 1/24* (2013.01); *F02F 11/005* (2013.01)

(58) Field of Classification Search
CPC ........ F02F 11/002; F02F 11/005; F02F 1/004; F02F 1/24
See application file for complete search history.

(56) References Cited

U.S. PATENT DOCUMENTS

| | | | |
|---|---|---|---|
| 4,739,999 A * | 4/1988 | Ishii | F16J 15/0825 277/595 |
| 5,310,197 A | 5/1994 | Bruch et al. | |
| 6,152,122 A | 11/2000 | Hampson et al. | |
| 7,377,520 B2 | 5/2008 | Imai | |
| 8,052,154 B2 | 11/2011 | Yasuda | |
| 8,826,874 B2 | 9/2014 | Hattiangadi et al. | |

FOREIGN PATENT DOCUMENTS

| | | |
|---|---|---|
| DE | 10123487 A1 | 11/2002 |
| EP | 2138745 B1 | 5/2011 |
| EP | 2733396 A1 | 5/2014 |
| JP | 3420649 B2 | 6/2003 |
| JP | 4382936 B2 | 12/2009 |

* cited by examiner

*Primary Examiner* — Jacob Amick (57) ABSTRACT

A head gasket is provided for use in an engine having a cylinder head and a cylinder liner with a side wall defining a combustion chamber, the cylinder liner including a liner flange projecting from the side wall in an outward direction away from the combustion chamber. The head gasket includes a main body layer and a flange layer coupled to the main body layer by a flange wrap portion. The flange wrap portion is sized for axial alignment with the side wall of the cylinder liner, and the flange layer is spaced from the main body layer to define a gap between the main body layer and the flange layer adjacent the flange wrap portion. A core layer is coupled to the main body layer and includes a sealing bead spaced outwardly from the flange wrap portion and sized for axial alignment with the liner flange.

17 Claims, 6 Drawing Sheets

HEAD GASKET FOR AN ENGINE

TECHNICAL FIELD

The present disclosure generally relates to gaskets, and more particularly to head gaskets for use between cylinder heads and cylinder liners of engines.

BACKGROUND

Head gaskets are generally known that have a sealing bead for sealing the interface between a cylinder head and a cylinder of an engine. Such gaskets, however, may disadvantageously introduce crevice volume to the combustion chamber defined by the cylinder. More specifically, known head gaskets extend only partially across the mating surfaces of the cylinder head and cylinder, thereby introducing an annular shaped crevice volume extending outwardly from a combustion chamber to the inner diameter of the gasket. Crevice volume is a source of unburned hydrocarbons that are subject to control by emissions regulations, and therefore reduction of crevice volume may be advantageous.

While the goal of reducing crevice volume may appear straightforward, some applications require additional considerations that prevent the use of known solutions. In smaller engines where the cylinder is formed directly in an engine block, for example, it is known to reduce the diameter of the sealing bead to substantially match the diameter of the combustion chamber, thereby reducing the crevice volume. This approach, however, is not applicable engines having top flange cylinder liners that are inserted into the engine block, as the load path when assembled extends from the cylinder head, through the sealing bead of the gasket, into the flange of the cylinder liner, and finally to the block. As a result, the sealing bead of a gasket used with a top flange cylinder liner must be aligned with the cylinder liner flange to avoid generating excess stress and bending moments. The cylinder liner flange is larger than the cylinder bore diameter, and therefore it is not possible to reduce the sealing bead diameter to reduce crevice volume without introducing undesirable stress and bending of the liner.

SUMMARY OF THE DISCLOSURE

In accordance with one aspect of the present disclosure, a head gasket is provided for use in an engine having a cylinder head and a cylinder liner with a side wall defining a combustion chamber, the cylinder liner including a liner flange projecting from the side wall in an outward direction away from the combustion chamber. The head gasket includes a main body layer and a flange layer coupled to the main body layer by a flange wrap portion. The flange wrap portion is sized for axial alignment with the side wall of the cylinder liner, and the flange layer is spaced from the main body layer to define a gap between the main body layer and the flange layer adjacent the flange wrap portion. A core layer is coupled to the main body layer and includes a sealing bead spaced outwardly from the flange wrap portion and sized for axial alignment with the liner flange.

In accordance with another aspect of the present disclosure, an engine includes a cylinder head, and a cylinder liner having a side wall defining a combustion chamber and having a liner flange projecting from the side wall in an outward direction away from the combustion chamber. A head gasket is disposed between the cylinder head and the cylinder liner and includes a main body layer and a flange layer coupled to the main body layer by a flange wrap portion. The flange wrap portion is sized for axial alignment with the side wall of the cylinder liner, and the flange layer is spaced from the main body layer to define a gap between the main body layer and the flange layer adjacent the flange wrap portion. A core layer is coupled to the main body layer and includes a sealing bead spaced outwardly from the flange wrap portion and sized for axial alignment with the liner flange.

In accordance with another aspect of the present disclosure, a head gasket is provided for use in an engine having a cylinder head and a cylinder liner, the cylinder liner including a side wall having a width and defining a combustion chamber having a bore diameter, and a liner flange projecting from the side wall in an outward direction away from the combustion chamber. The head gasket includes a main body layer, and a flange layer coupled to the main body layer by a flange wrap portion. The flange wrap portion has a wrap exterior surface defining a flange wrap diameter equal to the bore diameter of the combustion chamber, so that the flange wrap portion is axially aligned with the side wall of the cylinder liner. The flange layer is spaced from the main body layer to define a gap between the main body layer and the flange layer adjacent the flange wrap portion, with the gap having a length greater than the width of the side wall of the cylinder liner. A core layer is coupled to the main body layer and includes a sealing bead spaced outwardly from the flange wrap portion and sized for axial alignment with the liner flange.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Embodiments of a head gasket are disclosed herein for use in an engine having a cylinder head and a top flange cylinder liner. The head gasket includes a sealing bead sized for alignment with a flange of the cylinder liner with main and flange layers that extend inwardly from the sealing bead and are joined at a flange wrap. The flange wrap is aligned with a side wall of the cylinder liner that defines the combustion bore so that the gasket occupies the space between the cylinder head and the cylinder liner, thereby reducing crevice volume.

Figure 1:
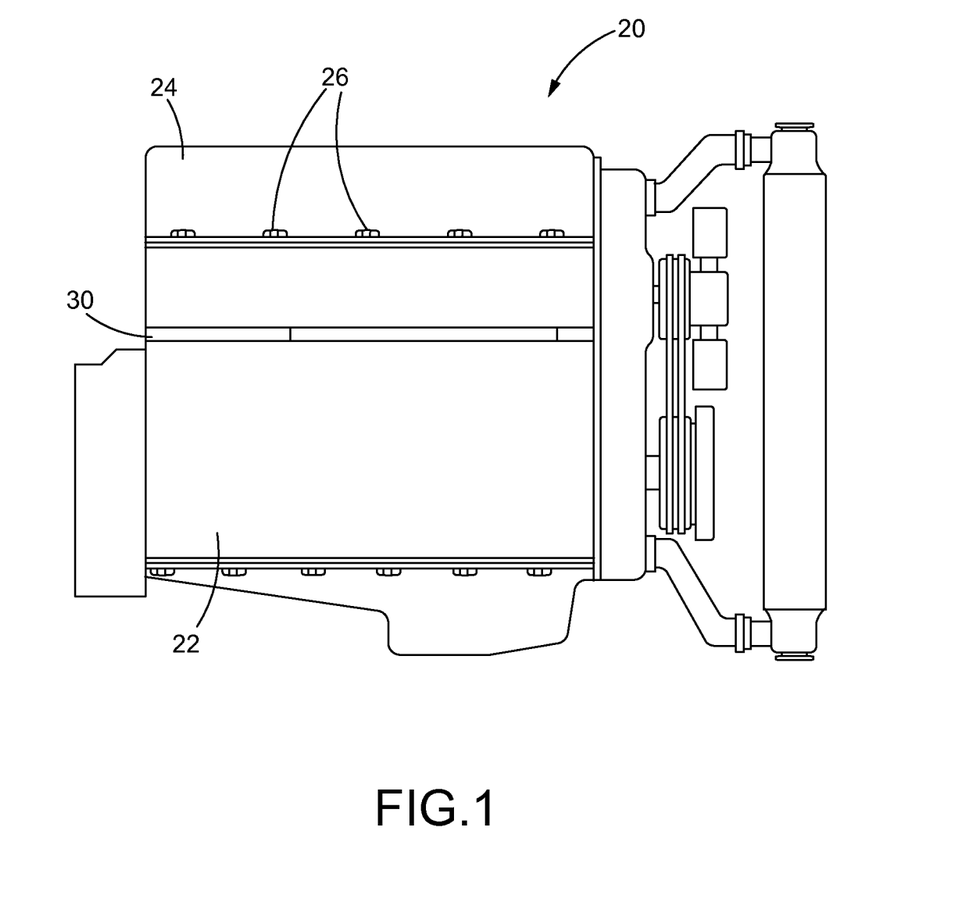
FIG. 1 is a side elevation view of an engine having a gasket formed according to the present disclosure.

As best shown in FIG. 1, an internal combustion engine 20 includes an engine block 22 and a cylinder head 24 removably attached to the engine block 22, such as by a plurality of bolts 26. A head gasket 30 is sealingly positioned between the engine block 22 and the cylinder head 24.

Figure 2A:
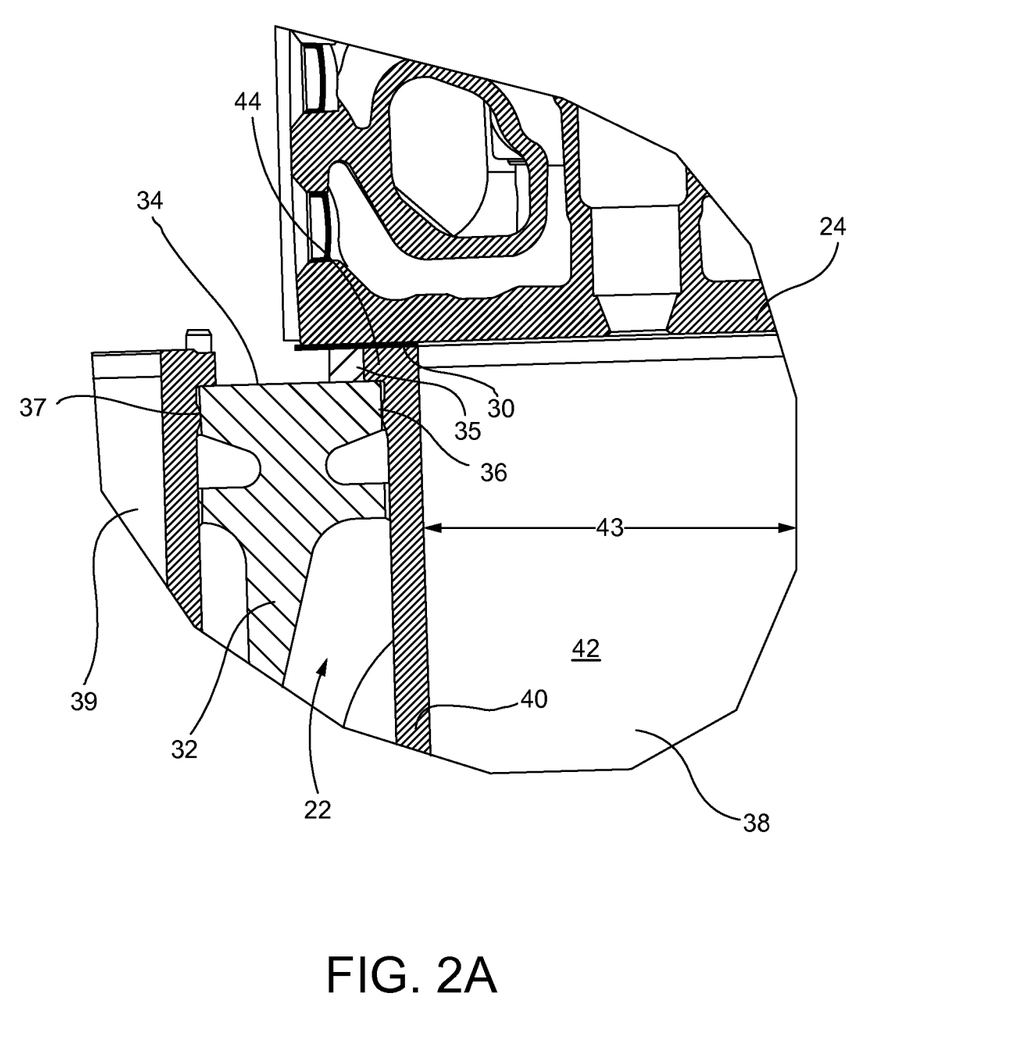
FIG. 2A is an enlarged side view, in cross-section, of a portion of the engine of FIG. 1.

The engine block 22 generally provides support for the components of the engine. As best shown in FIG. 2A, for example, the engine block 22 includes an intermediate block support 32 having a block support face 34. A block aperture 36 is formed in the block support face 34 and is sized to receive a cylinder liner 38. More specifically, the cylinder liner 38 includes a side wall 40 defining a combustion chamber 42 having a bore diameter 43, and a liner flange 44 extending outwardly from the side wall 40. The block support face 34 engages liner flange 44 to support the cylinder liner 38 within the block aperture 36. A spacer plate 35 may provided on top of the block support face 34 and disposed between the engine block 22 and the cylinder head 24. FIG. 2A also illustrates a second block aperture 37 formed in the block support face 34 and sized to receive a second cylinder liner 39. While the illustrated embodiment shows two cylinder liners 38, 39, it will be appreciated that the engine block 22 may support more or less than two cylinder liners without departing from the scope of this disclosure.

Figure 2B:
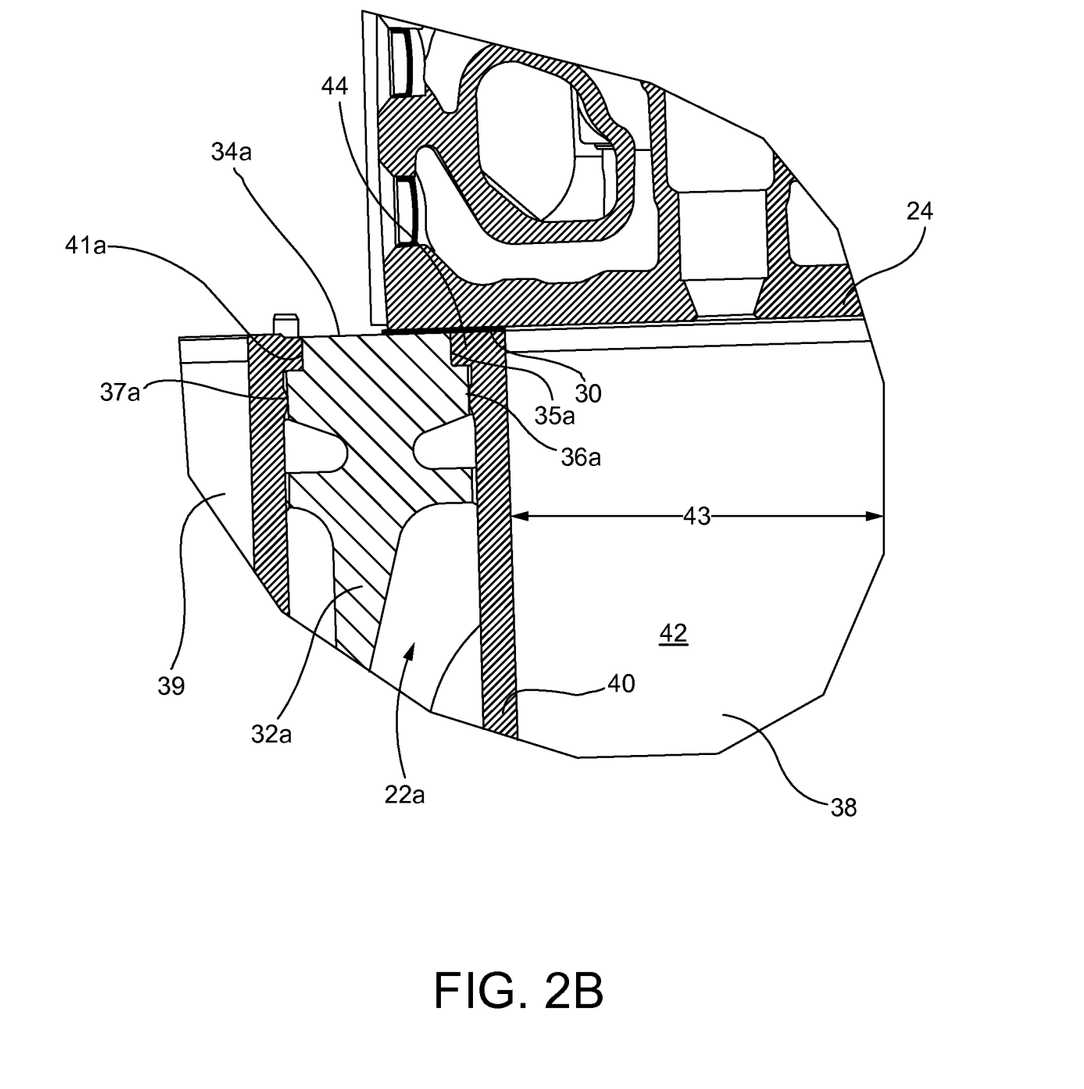
FIG. 2B is an enlarged side view, in cross-section, of a portion of an engine having an engine block formed with counter-bores to receive cylinder liner flanges.

An alternative embodiment of an engine block 22a is illustrated at FIG. 2B. The engine block 22a includes an intermediate block support 32a having a block support face 34a. A block aperture 36a is formed in the block support face 34a and is sized to receive the cylinder liner 38. More specifically, a counter-bore 35a is formed in the intermediate block support 32a that is sized to receive the liner flange 44. The engine block 22a may further include a second block aperture 37a having a second counter-bore 41a sized to receive a liner flange of the second cylinder liner 39.

Figure 3:
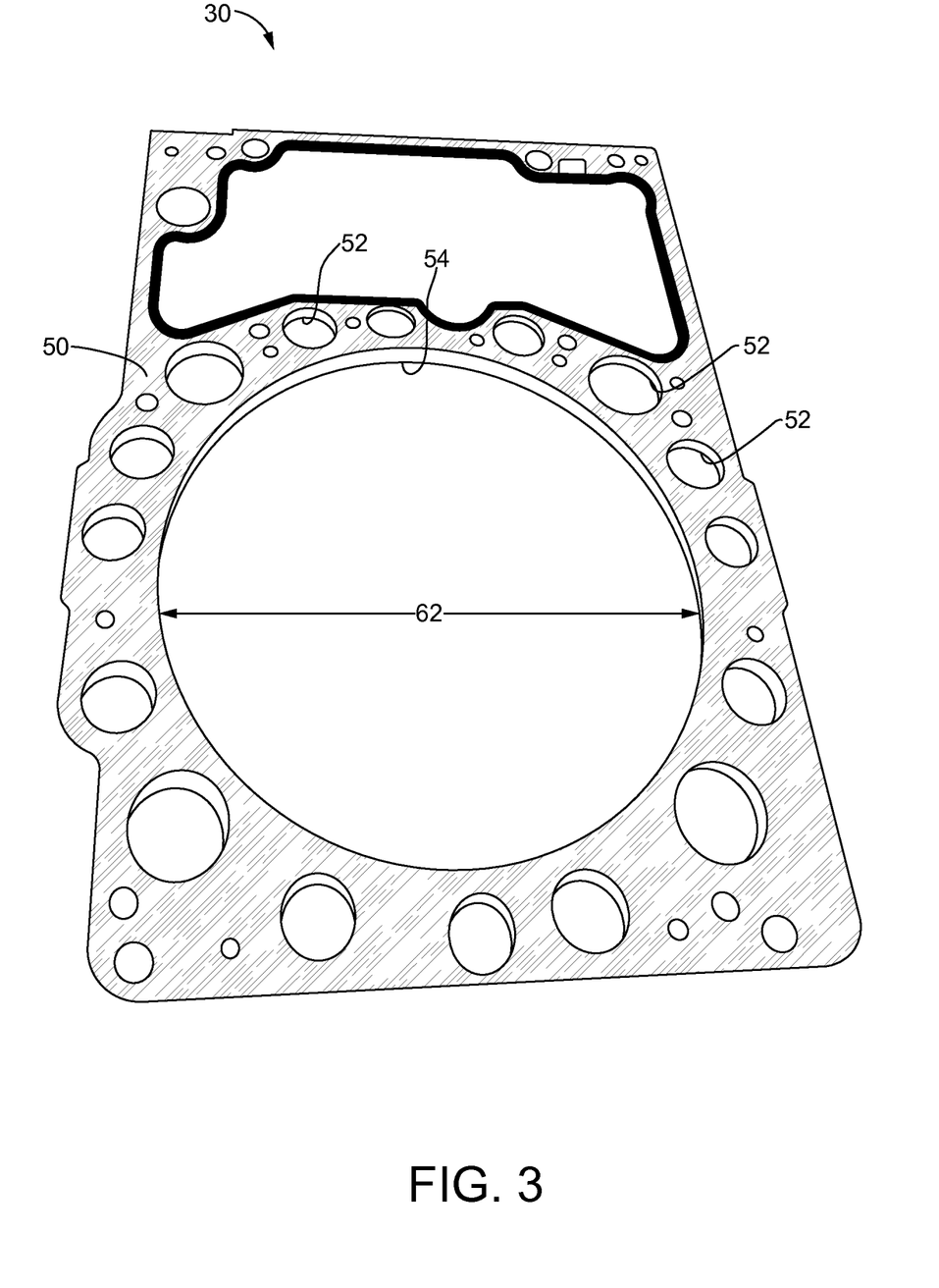
FIG. 3 is a perspective view of the gasket provided with the engine of FIG. 1.

The head gasket 30 is shown in greater detail in FIG. 3. In the illustrated embodiment, the head gasket 30 includes a main body layer 50 having a generally rectangular-shaped perimeter. A plurality of relatively small apertures 52 are formed through the main body layer 50 to provide bolt hole passages, water passages, oil passages, and other voids that permit portions of the cylinder head 24 to fluidly communicate with corresponding portions of the engine block 22. A relatively large aperture provides a combustion opening 54 for fluidly communicating with the combustion chamber 42 when the engine 20 is assembled.

Figure 4:
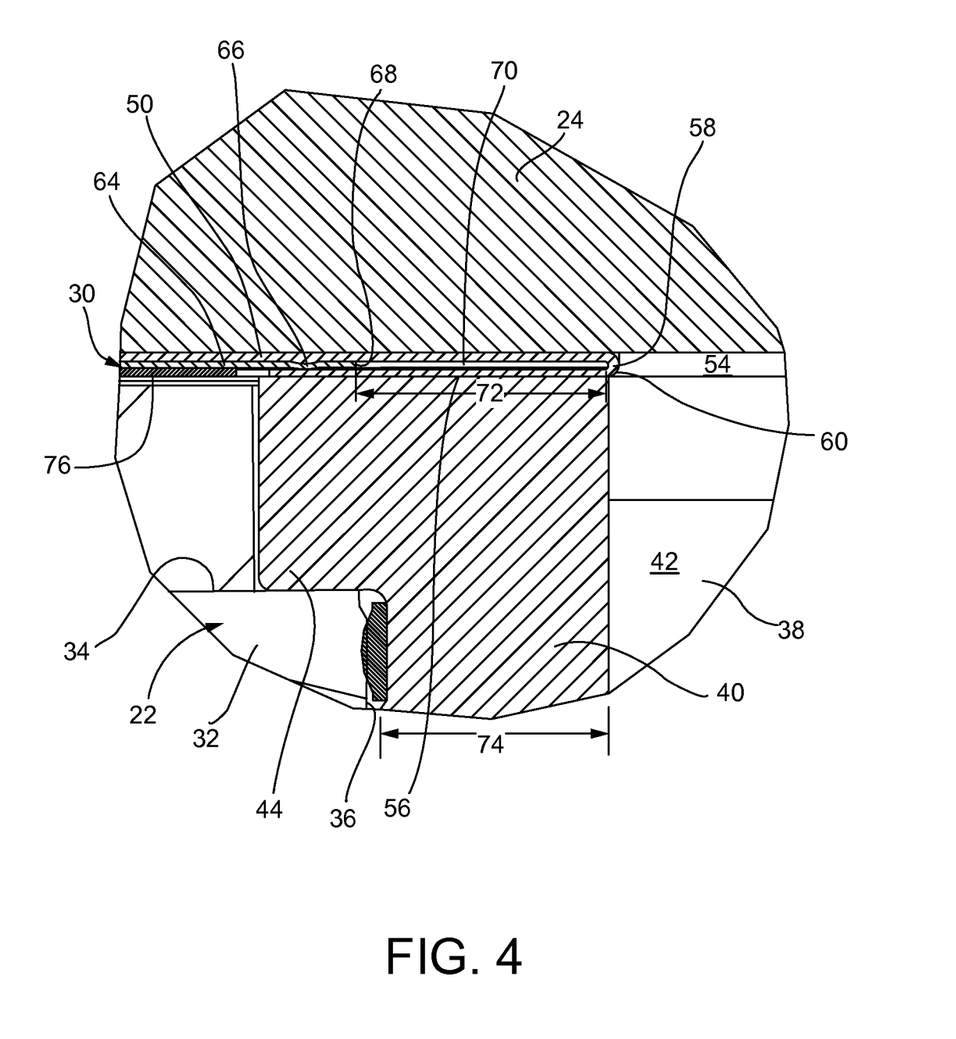
FIG. 4 is an enlarged side view, in cross-section, of a portion of the engine of FIG. 1 showing part of the gasket of FIG. 3.

In at least the area bordering the combustion opening 54, the head gasket 30 includes a flange layer 56 configured to occupy the space between the engine block 22 and the cylinder head 24. As best shown in FIG. 4, the flange layer 56 is coupled to the main body layer 50 by a flange wrap portion 58. The main body layer 50, flange layer 56, and flange wrap portion 58 may be integrally formed as illustrated, or alternatively may be provided as independent components that are subsequently assembled.

In the illustrated embodiment, the flange wrap portion 58 is generally U-shaped so that the flange layer 56 is folded over the main body layer 50. The flange wrap portion 58 has a wrap exterior surface 60 defining a flange wrap diameter 62 (FIG. 3). The flange wrap portion 58 is sized so that the wrap exterior surface 60 is substantially aligned axially with the side wall 40 of the cylinder liner 38. More specifically, the flange wrap diameter 62 is approximately the same as the bore diameter 43 of the combustion chamber 42, so that the main body layer 50 and flange layer 56 occupy the space between the cylinder head 24 and the cylinder liner 38, thereby to reduce crevice volume.

The head gasket 30 further includes a core layer 64 to provide a combustion seal between the cylinder liner 38 and the cylinder head 24. In the embodiment illustrated in FIG. 4, the core layer 64 is disposed between the main body layer 50 and the flange layer 56 and includes a sealing bead 66 spaced outwardly from the flange wrap portion 58. More specifically, the sealing bead 66 is sized so that it is axially aligned with the liner flange 44, so that a load applied by the cylinder head and through the gasket is directed onto the liner flange, and therefore directly countered by the intermediate block support 32 of the engine block 22. Accordingly, by aligning the sealing bead 66 with the liner flange, undue stresses and bending moments are advantageously avoided. Additionally, it will be appreciated that the head gasket 30 has a substantially uniform thickness from the sealing bead 66 to the flange wrap portion 58.

The head gasket 30 is further configured to have relatively less stiffness near the flange wrap portion 58 to further prevent undue stresses and bending moments. As best shown in FIG. 4, the core layer 64 further defines a terminal end 68 disposed inwardly of the sealing bead 66 and spaced from the flange wrap portion 58. By terminating the core layer 64 short of the flange wrap portion 58, inner sections of the main body layer 50 and flange layer 56 define an annular gap 70 adjacent the flange wrap portion 58. When assembled and placed under a load, the main body layer 50 and flange layer 56 may deflect into the annular gap 70 instead of transferring the load to the cylinder liner 38, thereby avoiding additional stresses and bending applied to the cylinder liner 38. In the illustrated embodiment, the annular gap 70 has a gap length 72 which is greater than a width 74 of the side wall 40 of the cylinder liner 38, thereby to more reliably ensure that load forces are not applied to the side wall 40 of the cylinder liner 38.

The head gasket 30 may further include a base layer 76 coupled to the main body layer 50 and the core layer 64, as best shown in FIG. 4. The base layer 76 is provided to give the portion of the head gasket 30 located outside the liner flange 44 a thickness that is similar to the thickness of the head gasket 30 inside the liner flange 44, thereby to prevent the cylinder head 24 from bending over the outside edge of the liner flange 44. The base layer 76 may have substantially the same thickness and may be disposed in substantially the same plane as the flange layer 56 as shown.

Figure 5:
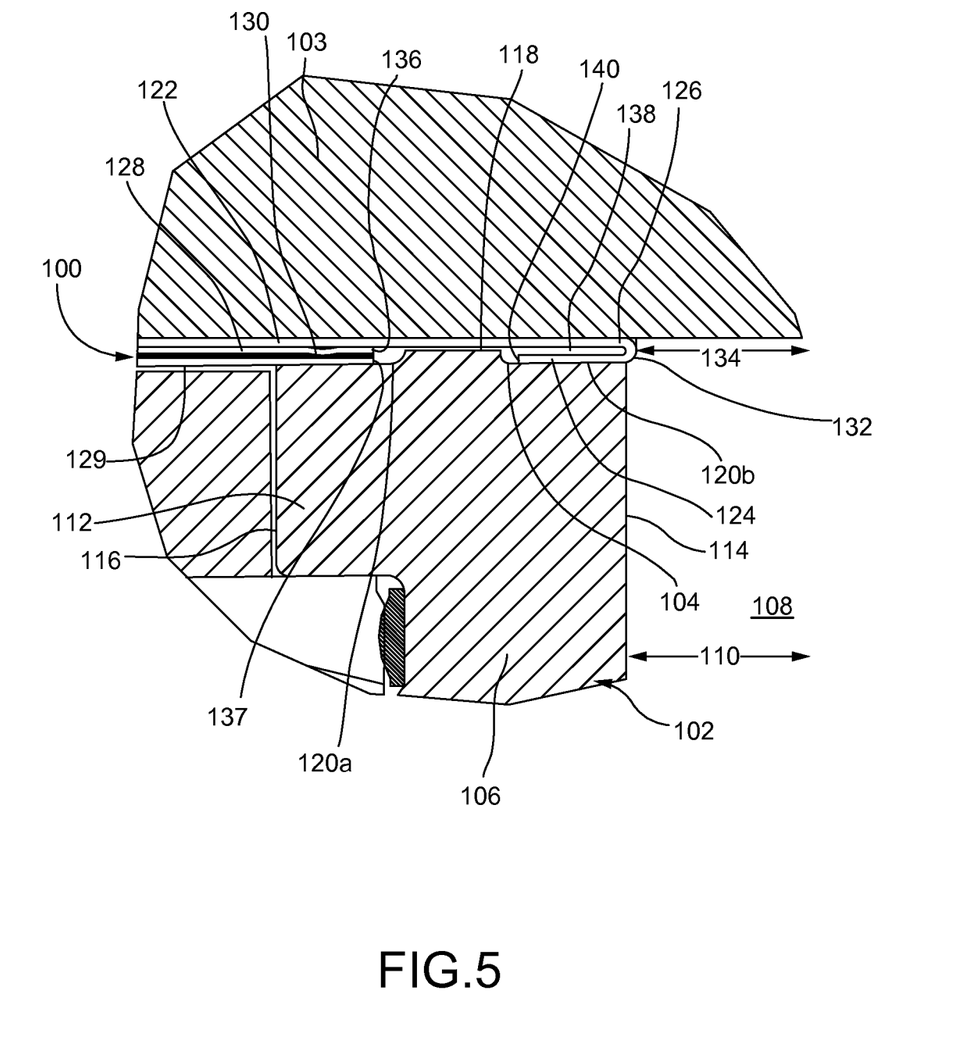
FIG. 5 is an enlarged side view, in cross-section, of a portion of the engine of FIG. 1 showing part of an alternative embodiment of the gasket.

FIG. 5 illustrates an alternative embodiment of a head gasket 100 for use with a cylinder liner 102 and cylinder head 103 that is modified to protect a liner face 104 of the cylinder liner 102 during handling and assembly. More specifically, the cylinder liner 102 includes a side wall 106 defining a combustion chamber 108 having a bore diameter 110, and a liner flange 112 extending outwardly from the side wall 106. The liner face 104 extends along a top of the cylinder liner 102 from an inner surface 114 of the side wall 106 to an outer surface 116 of the liner flange 112. The liner face 104 includes a raised land 118 disposed between the inner surface 114 of the side wall 106 and the outer surface 116 of the liner flange 112. The raised land 118 protects recessed surfaces 120a, 120b of the liner face 104 during handling and assembly, thereby avoiding damage to surfaces that are sealingly engaged by the head gasket 100.

The head gasket 100 is configured to accommodate the raised land 118 provided on the liner face 104. Similar to the head gasket 30 described above, the head gasket 100 includes a main body layer 122 coupled to a flange layer 124 by a flange wrap portion 126. The flange wrap portion 126 has a flange wrap exterior surface 132 configured to substantially align axially with the inner surface 114 of the side wall 106, such as by having a flange wrap diameter 134 substantially equal to the bore diameter 110 of the combustion chamber 108, so that the main body layer 122 and flange layer 124 occupy the space between the cylinder head 103 and the cylinder liner 102, thereby to reduce crevice volume. An annular gap 138 may be provided between the main body layer 122 and the flange layer 124 adjacent the flange wrap portion 126 to accommodate deflection of the main body layer 122 and/or flange layer 124, thereby reducing the amount of force that may be imparted to the cylinder liner 102.

A core layer 128 is coupled to the main body layer 122 and defines a sealing bead 130 spaced outwardly from the flange wrap portion 126 that is sized for axial alignment with the liner flange 112. In this embodiment, the core layer 128 is disposed between the main body layer 122 and a base layer 129. Both the core layer 128 and the base layer 129 have terminal ends 136, 137, respectively, that are disposed inwardly of the sealing bead 130 and outwardly of the flange layer 124. A slot 140 is formed between the core layer 128 and the base layer 129 on one side, and the flange layer 124 on the other side, and is sized to receive the raised land 118 of the liner face 104. Accordingly, unlike the head gasket 30 shown in FIG. 4, the head gasket 100 has a varying thickness between the sealing bead 130 and the flange wrap portion 126 to accommodate the raised land 118 of the liner face 104.

INDUSTRIAL APPLICABILITY

Embodiments of a head gasket are disclosed herein for use in an engine having a cylinder head and a top flange cylinder liner. The head gasket includes a sealing bead sized for alignment with a flange of the cylinder liner with main and flange layers that extend inwardly from the sealing bead and are joined at a flange wrap. The flange wrap is aligned with a side wall of the cylinder liner that defines the combustion bore so that the gasket occupies the space between the cylinder head and the cylinder liner. As a result, the head gasket reduces crevice volume while still maintaining the sealing bead in a position that transfers loads directly to the engine block, thereby avoiding introducing stresses and bending moments on the cylinder liner.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A head gasket for use in an engine having a cylinder head and a cylinder liner having a side wall defining a combustion chamber, the cylinder liner including a liner flange projecting from the side wall in an outward direction away from the combustion chamber, the head gasket comprising:
   a main body layer;
   a flange layer coupled to the main body layer by a flange wrap portion, the flange wrap portion being sized for axial alignment with the side wall of the cylinder liner, the flange layer being spaced from the main body layer to define a gap between the main body layer and the flange layer adjacent the flange wrap portion, wherein the cylinder liner defines a liner face extending from the side wall to an outer surface of the liner flange, the liner face including a raised land disposed between the side wall and the outer surface of the liner flange, and wherein the head gasket further includes a base layer coupled to the main body layer and spaced from the flange layer by a slot sized to receive the raised land; and
   a core layer coupled to the main body layer and including a sealing bead spaced outwardly from the flange wrap portion and sized for axial alignment with the liner flange.

2. The head gasket of claim 1, in which the combustion chamber defined by the side wall has a bore diameter, and in which the flange wrap portion has a wrap exterior surface defining a flange wrap diameter substantially equal to the bore diameter.

3. The head gasket of claim 1, in which the main body layer and flange layer are integrally formed.

4. The head gasket of claim 1, in which the annular gap has a length greater than a width of the side wall of the cylinder liner.

5. The head gasket of claim 1, in which the head gasket has a uniform thickness from the sealing bead to the flange wrap portion.

6. The head gasket of claim 1, in which the core layer includes a terminal end disposed outwardly of the slot.

7. An engine comprising:
   a cylinder head;
   a cylinder liner having a side wall defining a combustion chamber and a liner flange projecting from the side wall in an outward direction away from the combustion chamber, wherein the cylinder liner defines a liner face extending from the side wall to an outer surface of the liner flange, the liner face including a raised land disposed between the side wall and the outer surface of the liner flange; and
   a head gasket disposed between the cylinder head and the cylinder liner, the head gasket including:
      a main body layer;
      a flange layer coupled to the main body layer by a flange wrap portion, the flange wrap portion being sized for axial alignment with the side wall of the cylinder liner, the flange layer being spaced from the main body layer to define a gap between the main body layer and the flange layer adjacent the flange wrap portion;
a core layer coupled to the main body layer and including a sealing bead spaced outwardly from the flange wrap portion and sized for axial alignment with the liner flange; and
a base layer coupled to the main body layer and spaced from the flange layer by a slot sized to receive the raised land.

8. The engine of claim 7, in which:
the combustion chamber defined by the side wall has a bore diameter; and
the flange wrap portion has a wrap exterior surface defining a flange wrap diameter substantially equal to the bore diameter.

9. The engine of claim 7, in which the main body layer and flange layer of the head gasket are integrally formed.

10. The engine of claim 7, in which the annular gap between the main body layer and the flange layer has a length greater than a width of the side wall of the cylinder liner.

11. The engine of claim 7, in which the head gasket has a uniform thickness from the sealing bead to the flange wrap portion.

12. The engine of claim 7, in which the core layer includes a terminal end disposed outwardly of the slot.

13. The engine of claim 7, further comprising an engine block defining a block aperture sized to receive the cylinder liner and a block support face configured to engage a seat surface of the cylinder liner.

14. The engine of claim 13, in which the sealing bead is further sized for alignment with the seat surface of the cylinder liner.

15. A head gasket for use in an engine having a cylinder head and a cylinder liner, the cylinder liner including a side wall having a width and defining a combustion chamber having a bore diameter, and a liner flange projecting from the side wall in an outward direction away from the combustion chamber, the head gasket comprising:
a main body layer;
a flange layer coupled to the main body layer by a flange wrap portion, the flange wrap portion having a wrap exterior surface defining a flange wrap diameter equal to the bore diameter of the combustion chamber, so that the flange wrap portion is axially aligned with the side wall of the cylinder liner, the flange layer being spaced from the main body layer to define a gap between the main body layer and the flange layer adjacent the flange wrap portion, the gap having a length greater than the width of the side wall of the cylinder liner wherein the cylinder liner defines a liner face extending from the side wall to an outer surface of the liner flange, the liner face including a raised land disposed between the side wall and the outer surface of the liner flanged;
a base layer coupled to the main body layer and spaced from the flange layer by a slot sized to receive the raised land; and
a core layer coupled to the main body layer and including a sealing bead spaced outwardly from the flange wrap portion and sized for axial alignment with the liner flange.

16. The head gasket of claim 15, in which the main body layer and flange layer are integrally formed.

17. The head gasket of claim 15, in which the core layer includes a terminal end disposed outwardly of the slot.

* * * * *